(12) United States Patent
Holme et al.

(10) Patent No.: US 11,780,036 B2
(45) Date of Patent: Oct. 10, 2023

(54) LASER ASSISTED MICROMACHINING SYSTEM AND TEMPERATURE CONTROL METHOD USING SAME

(71) Applicant: AAC Optics Solutions Pte. Ltd., Singapore (SG)

(72) Inventors: Niels Christian Roemer Holme, Farum (DK); Bingke Zhu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 281 days.

(21) Appl. No.: 17/017,790

(22) Filed: Sep. 11, 2020

(65) Prior Publication Data

US 2020/0406409 A1    Dec. 31, 2020

Related U.S. Application Data

(63) Continuation-in-part of application No. 16/102,904, filed on Aug. 14, 2018, now abandoned.

(30) Foreign Application Priority Data

Jun. 11, 2018  (CN) .......................... 201810597341.X

(51) Int. Cl.
  *B23P 25/00*   (2006.01)
  *B23K 26/08*   (2014.01)
  (Continued)

(52) U.S. Cl.
  CPC ........ *B23P 25/006* (2013.01); *B23K 26/0093* (2013.01); *B23K 26/0648* (2013.01);
  (Continued)

(58) Field of Classification Search
  CPC ............ B23K 2103/52; B23K 26/0093; B23K 26/032; B23K 26/034; B23K 26/064;
  (Continued)

(56) References Cited

U.S. PATENT DOCUMENTS

2004/0104207 A1* 6/2004 Wu .................. B23K 28/02
                                                    219/121.84
2008/0016992 A1* 1/2008 Ehnes ................ B23Q 15/14
                                                    82/1.11
(Continued)

FOREIGN PATENT DOCUMENTS

JP      2005014169 A  *  1/2005
KR       1773667 B1  *  8/2017  ............... B08B 3/02

*Primary Examiner* — Nathaniel E Wiehe
*Assistant Examiner* — Dilnessa B Belay
(74) *Attorney, Agent, or Firm* — W&G Law Group

(57) ABSTRACT

A laser assisted micromachining system, includes a working sliding, a tool module, a laser module, and a temperature control module for the processing of a workpiece. The laser module is disposed in the working slide and moves with the working slide in three-dimensional space. The temperature control module includes a temperature sensor, a cooler, a controller and a coolant, which detects the real-time temperature value of the cooler. The cooler is located in the working slide and supports the tool module. The controller controls the working state of the cooler according to the temperature feedback. Control signal induced by the temperature indicator, and the working state of the cooler are controlled by the controller. The coolant is used to control the temperature distribution of the cooler in the setting range. At the same time, the invention also provides a temperature control method for the laser assisted micro machining system.

13 Claims, 7 Drawing Sheets

(51) Int. Cl.
*B23K 26/06* (2014.01)
*B23K 26/354* (2014.01)
*B23K 26/70* (2014.01)
*B23K 26/00* (2014.01)

(52) U.S. Cl.
CPC ........ *B23K 26/0884* (2013.01); *B23K 26/354* (2015.10); *B23K 26/703* (2015.10); *B23K 26/705* (2015.10)

(58) Field of Classification Search
CPC .... B23K 26/703; B23K 31/10; B23K 26/354; B23P 25/006
See application file for complete search history.

(56) References Cited

U.S. PATENT DOCUMENTS

| | | | |
|---|---|---|---|
| 2010/0065536 A1* | 3/2010 | Patten | B23K 26/0093 219/121.75 |
| 2010/0272529 A1* | 10/2010 | Rozzi | B23Q 11/1046 408/56 |
| 2011/0048183 A1* | 3/2011 | Shin | B23B 27/10 82/51 |
| 2018/0015578 A1* | 1/2018 | Ravindra | B23C 5/16 |

* cited by examiner

LASER ASSISTED MICROMACHINING SYSTEM AND TEMPERATURE CONTROL METHOD USING SAME

FIELD OF THE DISCLOSURE

The present disclosure generally relates to a laser assisted micromachining system, and more particularly, to a temperature control system for processing workpieces, and method using the same.

BACKGROUND

Hard machining materials such as alloy steel and technical ceramics have excellent characteristics, which have been applied to machines and processes of small size structures and workpieces. In the process of machining hard material, due to its high strength and high hardness, some characteristic precision cuts are limited by the stiffness of the parts and the strength and stiffness of the conventional micro tool. Rapid wear of the tool will also lead to a reduction of the machining precision of the workpieces and increase in production time. Therefore, it is necessary to use effective methods to process these workpieces.

The laser assisted processing for micro cutting is a composite processing technology. The method includes the following steps: providing a focused laser beam on the surface of the workpiece where it should be processed, so that an area of the material is softened due to high temperatures. This reduce the strength and hardness of the workpiece material and thereby reducing the force applied on the micromachining.

When the laser assisted micromachining system is used to process a workpiece with a minute structure, the method of using laser assisted micromachining has the most obvious effect on the temperature distribution, the range of heat affected area and the depth of the softening layer.

Laser heating obviously improves the cutting performance of the material surface and facilitation of cutting, but there are still defects as follows: with the increase of laser power and the increase of cutting speed, the heat of the surface of the tool material is easy to gather and transmit to the tool carrier of the machined workpieces. If the heat is not released in time, it is easy to lead to the surface temperature of tool carrier fluctuates greatly, as shown in FIG. 1.

Refer to FIG. 1, is the temperature distribution graph of the small scale structural workpiece by laser assisted micromachining, the curve one represents the surface temperature distribution of the tool material, especially the surface temperature close to the diamond bit 1333 on the carrier 133. The curve two represents the temperature distribution of the tool carrier, and the temperature of the tool carrier fluctuates between 22-28° C.

In view of the unstable temperature and fluctuation of the cutting tool, according to the principle of heat expansion and contraction, the dimension of the tool and tool carrier changes with the temperature, which affects the dimension of the tool and carrier during the process, and reduces the machining precision and the yield of the workpiece.

The laser power has the most obvious effect on the temperature distribution, the range of heat affected area and the depth of the softening layer, when the laser assisted micromachining system is used to process the minute structure.

Therefore, it is desired to provide a new temperature control system which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
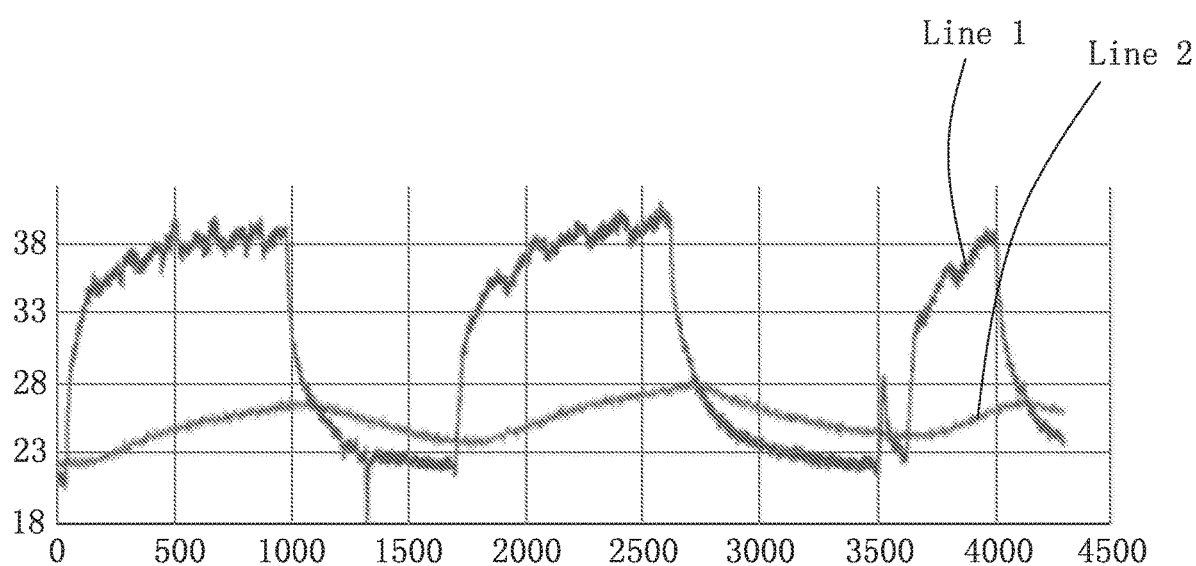
FIG. 1 is a temperature distribution graph of the micro scale workpiece processed by laser assisted micromachining system in prior art.
Figure 2:
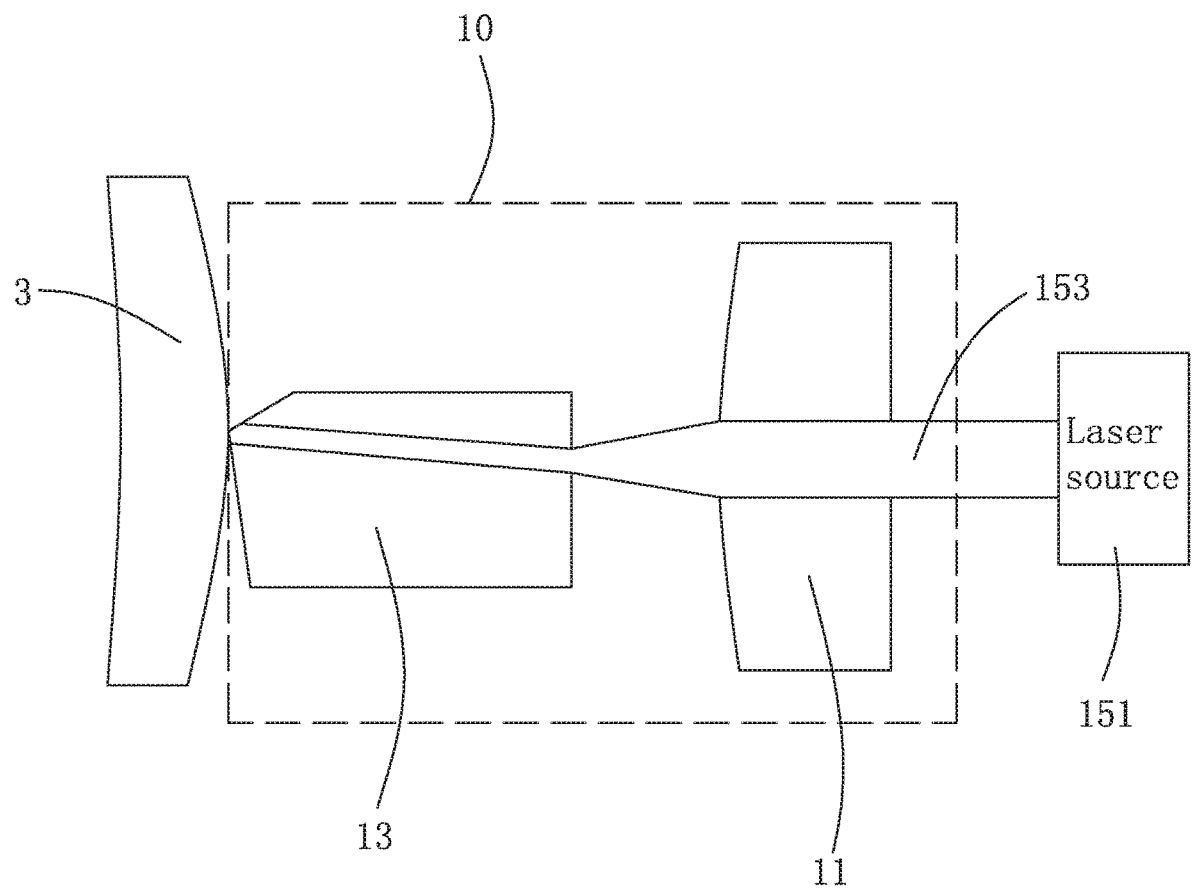
FIG. 2 is a schematic diagram of the laser assisted micromachining system for workpiece processing.

Refer to FIG. 2, shows a schematic diagram of the laser assisted micromachining system for the present invention. The laser assisted micromachining system 10 processes the workpiece 3. The laser assisted micromachining system 10 provides a laser beam to heat the workpiece 3 to make it easier to cut. By reasonably adjusting the laser power, the size and speed of the spot beam, the laser beam generated by the system is focused on the front end position of the tool module 13 (see FIG. 5). The ejected laser beam form the system heats the surface of the workpiece 3 to be processed so as to irradiate and change mechanical properties of the workpiece's material, and reduce the difficulty of the cutting process.

Figure 3:
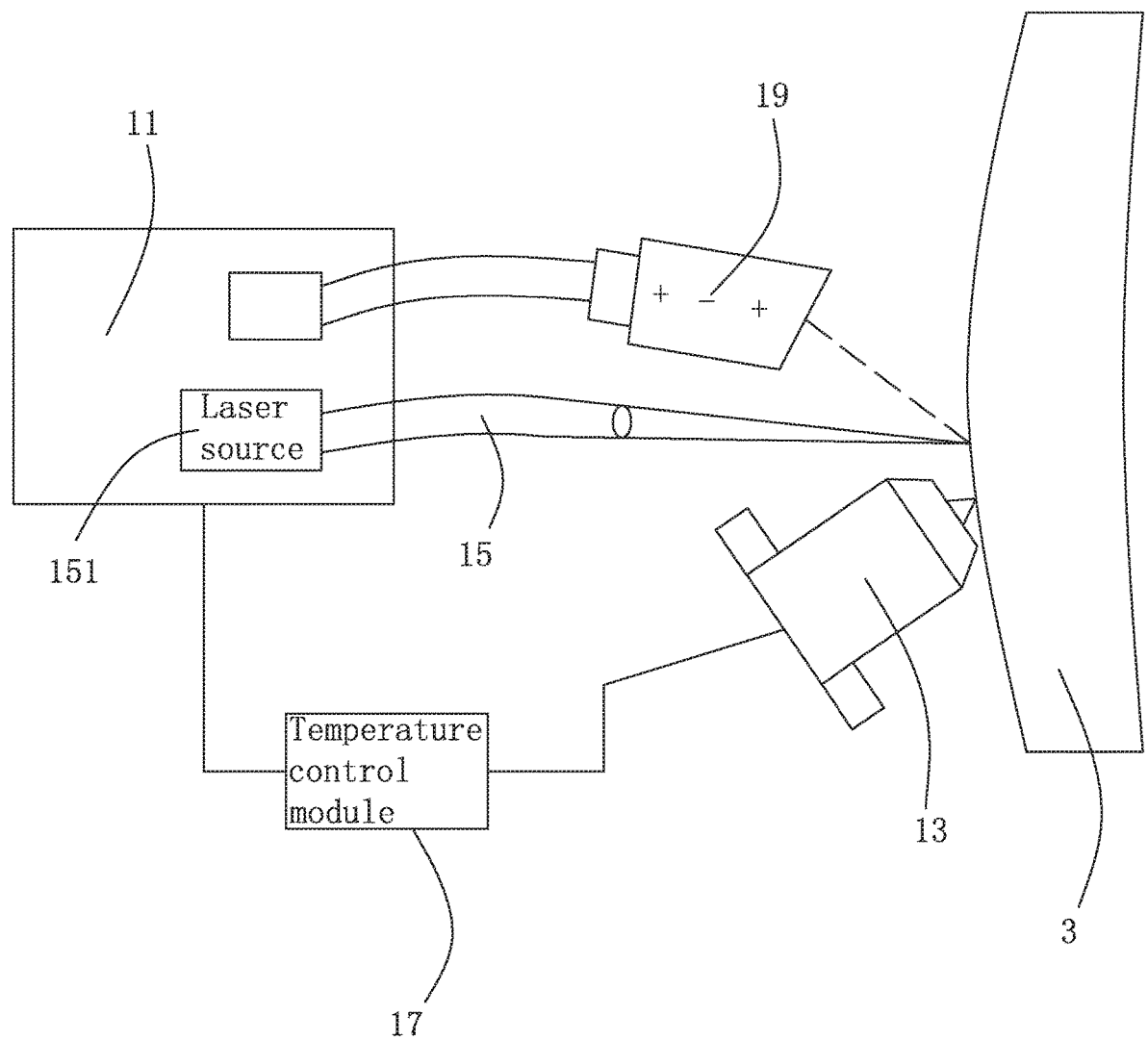
FIG. 3 is a schematic diagram of the laser assisted micromachining system.
Figure 4:
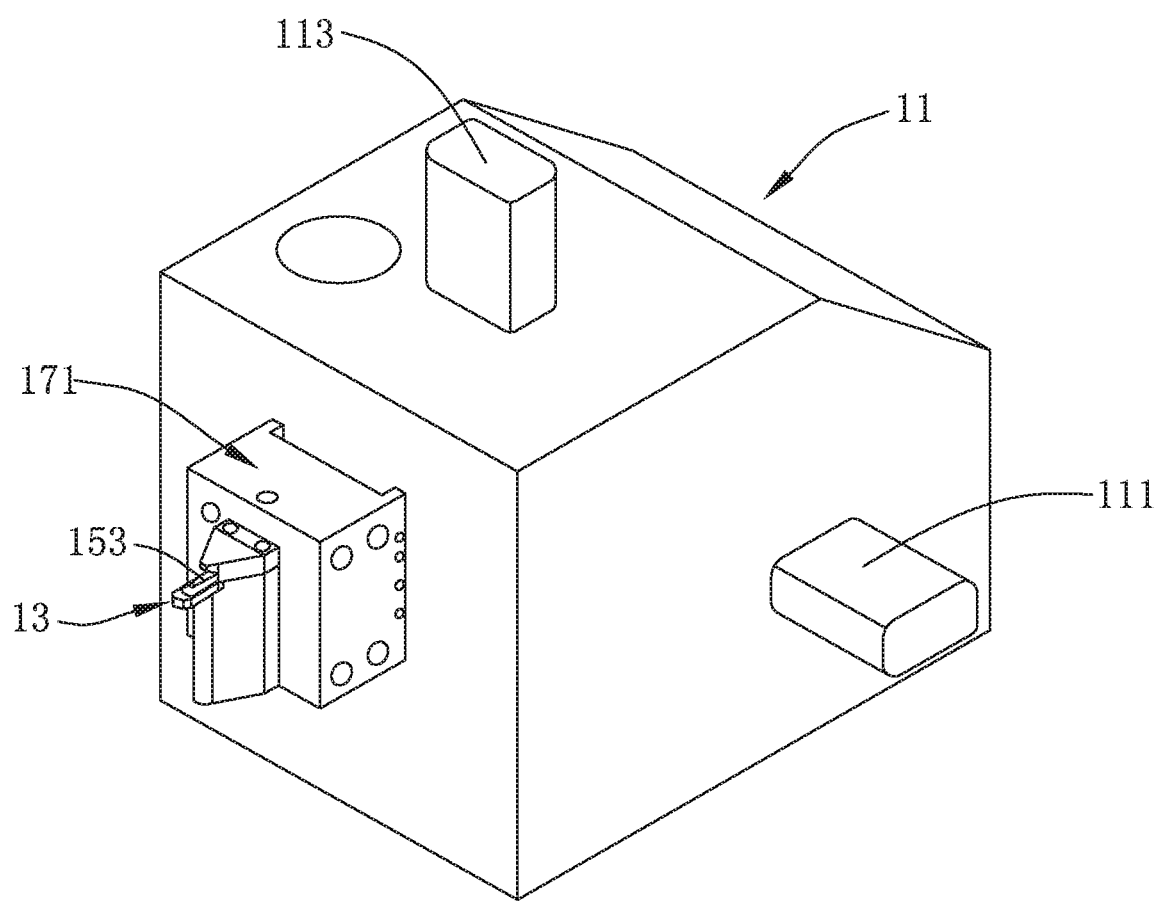
FIG. 4 is a schematic diagram of part of the laser assisted micromachining system shown in FIG. 3.

Please refer to FIG. 3 and FIG. 4 together, wherein FIG. 3 shows a schematic diagram of the structure of the laser assisted micromachining system, and FIG. 4 is a schematic diagram of part of the laser assisted micromachining system shown in FIG. 3. The laser assisted micromachining system 10 comprises a working slide 11, a tool module 13, a laser module 15, a temperature control module 17, and a CCD 19.

The working slide 11 comprises a horizontal knob 111 and a vertical knob 113. The tool module 13, the laser module 15 and the temperature control module 17 are arranged on the working slide 11. The tool module 13 driven by the horizontal knob 111 moves along the X axis direction and the Y axis, and the vertical knob 113 also drives the tool module 13 to move along the height direction, thus the tool module 11 can be moved in the three-dimensional space by the horizontal knob 111 matched with the vertical knob 113. The machining of workpiece 3 is realized.

Figure 5:
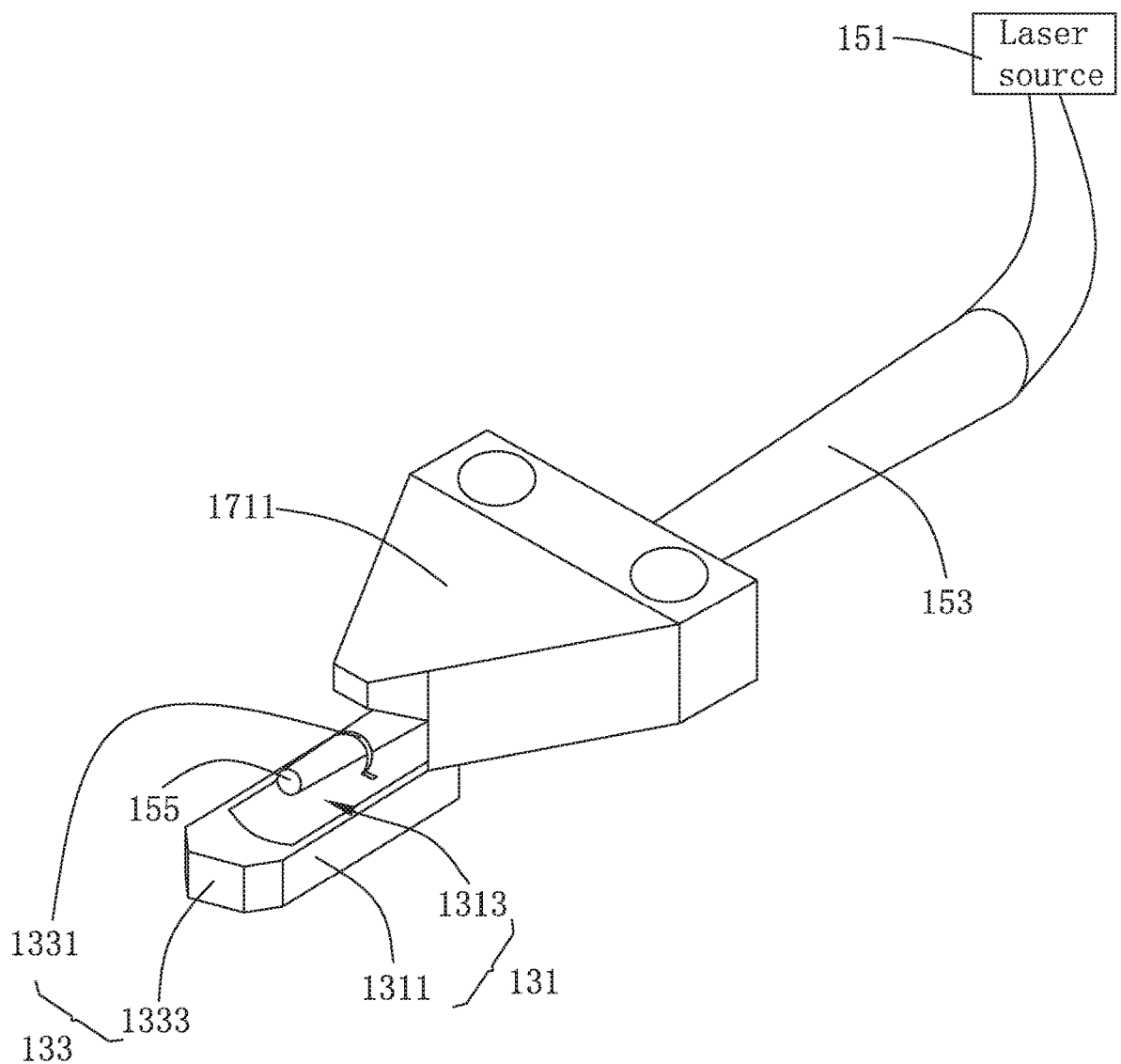
FIG. 5 is a schematic diagram of the stereoscopic structure of the tool module shown in FIG. 4.

Please refer to FIG. 5, which is a schematic diagram of the stereoscopic structure of the tool module shown in FIG. 4.

The tool module 13 includes a carrier 131 and a tool 133 arranged thereon. The carrier 131 supports and fixed the tool 133.

The carrier 131 includes a metal matrix shank 1311 and a groove body 1313. The groove body 1313 is arranged on the metal matrix shank 1311. The tool 13 includes a fastening bolt 1331 and a diamond bit 1333. The diamond bit 1333 is correspondingly fixed to the groove body 1313 through fastening bolt 1331.

Please refer to FIG. 3 and FIG. 5 together. The laser module 15 includes a laser source 151, a laser transmission channel 153 and an integrated lens 155. The laser source 151 emits laser beam. The laser transmission channel 153 transmits the laser beam emitted from the laser source 151 to the integrated lens 155. The integrated lens 155 is located at the end of the tool 133. The integrated lens 155 receives the laser beam from the laser transmission channel 153 and focus on the front end of the tool 133 to irradiate the surface of the cutting position in the workpiece 3 to be processed. The laser transmission channel 153 is typically an optical fiber.

The laser module 15 is a fiber laser, which emits a laser beam to focus to the front end of the tool 13 to irradiate and heat the machined workpiece 3, so as to change the mechanical properties of the material, and make it easy for cutting processes.

Figure 6:
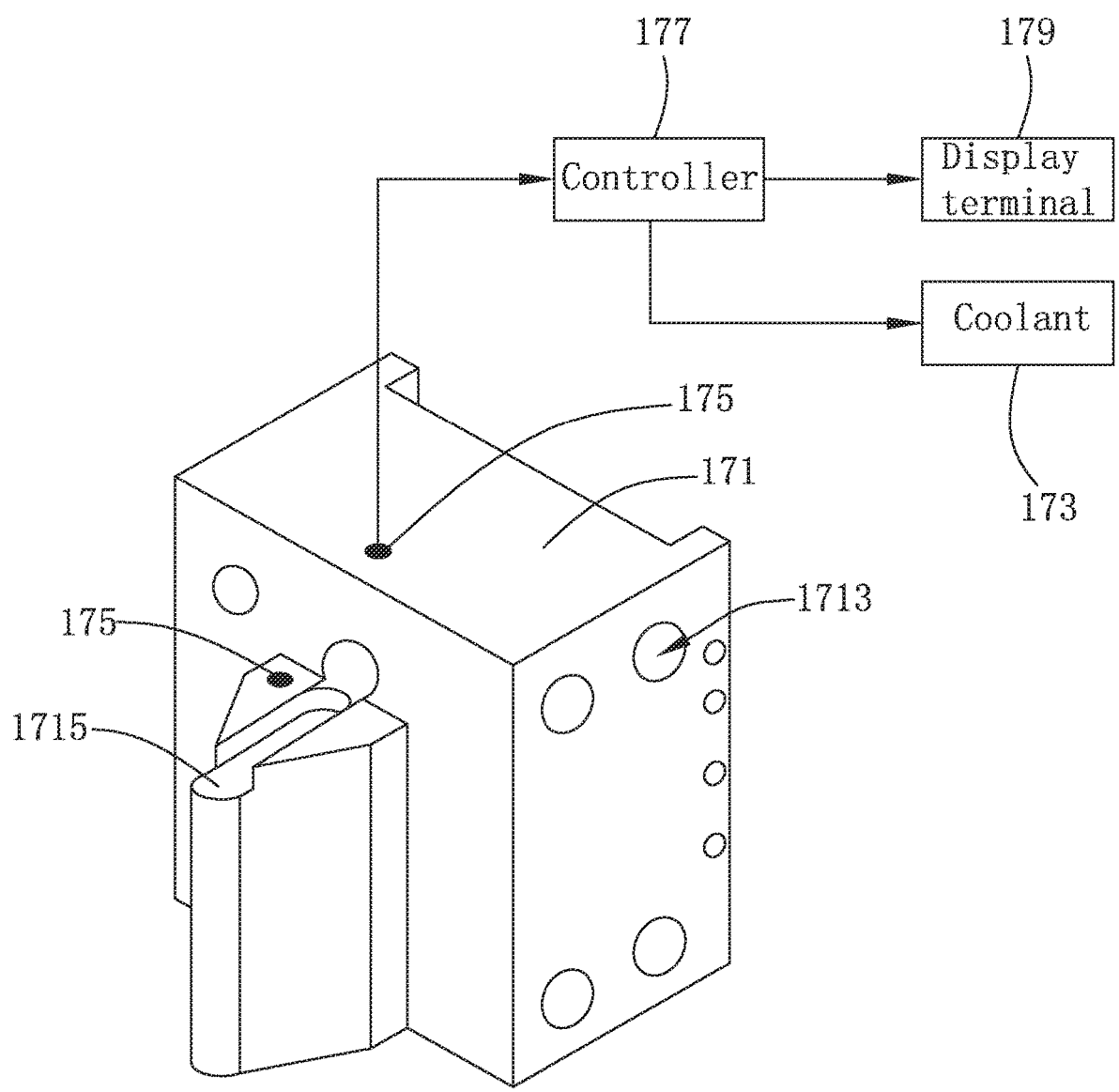
FIG. 6 is a schematic diagram of the temperature control module of the laser assisted micromachining system of the invention.

Please refer to FIG. 6, is the block diagram of the temperature control module shown in FIG. 3. The temperature control module 17 includes a cooler 171, a coolant 173, a temperature sensor 175, a controller 177 and a display terminal 179.

The cooler 171 includes a plurality of through-holes 1713 and a fixed slot 1715. The through-hole 1713 passes through the body of the cooler 171. The fixing slot 1715 receives the tool module 13 accordingly, and the metal matrix shank 1311 of the carrier 131 is received in the fixed slot 1715. A fin 1711 is disposed on the tool 133, which covers the tool 133.

The coolant 173 is a cooling liquid, also called "a liquid heat agent". The coolant 173 has good thermal physical properties, high specific heat, high thermal conductivity, low melting point, high boiling point and low saturation pressure.

The coolant 173 passes through the through-holes 1713 and circulates in the cooler. When the coolant 1713 circulates in the through-holes 1713, by its own thermal performance, the heat is effectively taken away from the surface and/or interior of the cooler 171, reducing the temperature of the cooler 171, and controlling the temperature of the cooler 171 within the set range. What/s more, the temperature control of the cooler 171 can improve the cooling efficiency of the cooler 171 by adjusting the flow rate and the flow speed of the coolant 173.

The temperature sensor 175 is used for detecting the real-time temperature of the cooler 171. The number of the temperature sensor 175 is more than one, respectively distributed on the surface of the cooler 171 and/or interior of the cooler 171, and the temperature inductor 175 detects the real-time temperature values of different positions of the cooler 171, so as to show the temperature distribution of the cooler 171 in different positions.

The controller 177 adopts closed-loop automatic control technology. The controller 177 receives real-time temperature values from the temperature sensor 175, and feedback control signals through PID.

When the controller 177 is in working state, there presets a standard temperature value in the controller 177, the standard temperature value means the working temperature range suitable for the cooler 171 of the laser assisted micromachining system 10.

When the real-time temperature value received by the controller 177 is higher than the standard temperature value or below the standard temperature value, the controller 177 feedbacks control signals to a valve controlling the coolant 173 correspondingly, further adjusts the working efficiency of the coolant 173 to improve the cooling efficiency of the coolant 173. For example that the standard temperature value of the cooler 171 is set below room temperature.

When the temperature sensor 175 detects that the actual temperature of the cooler 171 is less than 19.5° C., the controller 177 feedbacks control signals to drive the coolant 173 to reduce the cooling efficiency correspondingly, further, to avoid reducing dimension of the fixed slot 175 according to lower temperature.

When the temperature sensor 175 detects that the actual temperature value of the cooler 171 is higher than 19.5° C., the controller 177 feedbacks control signals to drive the coolant 173 to improve the cooling efficiency, so as to avoid increasing the dimension of the fixed slot 1715 caused by the excessive temperature resulting in the expansion of the fixed slot 1715 of the cooler 171.

Because the fixed slot 1715 corresponds to the holding and fixing the tool 133, so the heat expansion and contraction change of the fixed slot 1715 of the cooler 171 is easy to cause the size of the groove body 1313 and the metal matrix shank 1311, and then the machining accuracy of the tool 133 is reduced.

The display terminal 179 is a display device, which corresponds to visualizing the temperature distribution of the 171 surface or interior of the cooler 171, so as to make it conveniently for operator to monitor the working environment of the laser assisted micromachining system 10.

The CCD 19 is an image acquisition device, which is adjacent to the integrated lens 155 of the laser module 15 correspondingly. The CCD 19 collects the spot size of the laser beam through the integrated lens 155 and focused on the surface of the workpiece 3.

Compared with the related prior art, in the laser assisted micromachining system 10, the temperature control module 17 is added, and the cooler 171 of the temperature control module 17 is correspondingly adjacent to the tool module 13 setting.

Figure 7:
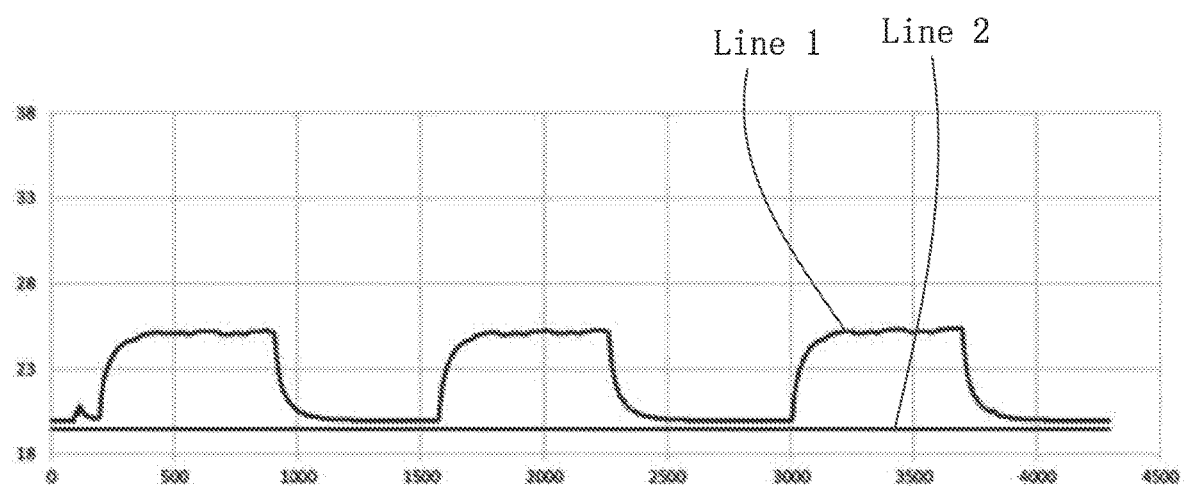
FIG. 7 is a temperature distribution graph of temperature distribution of the workpiece processed by the laser assisted micromachining system.

When the tool module 13 is processed for the workpiece 3, the high speed operation of the tool and the heat generated by the laser module 15 are easy to gather and cause the local temperature to be raised Moreover, On the other hand, because the cooler 173 is set against the tool module 13, the partial heat is transmitted to the cooler 173, and the temperature control module 17 dynamically adjusts the flow of the cooler 171, ensuring that the temperature of the cooler 171 is within the preset range, and the excess heat is rapidly escaped through the coolant 173. Improving the working environment of the tool module 13 of the laser assisted micromachining system 10, and avoiding the defects of heat accumulation, high temperature or too low processing precision. The improved temperature distribution curve is shown in FIG. 7, in which the fluctuation of the curve two is small, and the temperature of the cooler 171 tends to be stable.

Typically, the standard temperature value is not only limited to a range value, it can also be a specific temperature value. For example, Presetting a standard temperature value T0 saved in the controller 177, for example, the standard temperature value is 20° C., that is, T0=20° C.

When the actual temperature value of the cooler 171 T1>T0, the controller 177 generates a driving signal to increase the flow speed and flow rate of the coolant 173, and improves the cooling effect of the cooler 171.

When T1=T0, the controller 177 correspondingly generates another drive signal to maintain the flow speed and flow rate of the coolant 173, ensuring that the cooler 171 is maintained at a constant heat dissipation effect.

When T1<T0, the controller 177 corresponds to the production of a driving signal to reduce the flow speed and flow rate of the coolant 173, reducing the cooling effect of the coolant 173, and further saving energy and reducing the cost.

When the laser assisted micromachining system 10 is in working state, its working principle is as follows:

First, providing a workpiece 3 to be processed, and fixing to the front of the tool module 13;

Secondly, presetting a standard temperature value T0 in the controller 177 of the temperature control module 17;

Then, switching the laser module 15 and the tool module 13, the laser module 15 generates a laser beam through the laser transmission channel 153 to the integrated lens 155 and focus on the workpiece 3; at the same time, workpiece 3 is machined by the tool module 13;

Moreover, In addition, the temperature sensor 175 of the temperature control module 17 detects the surface temperature of the cooler 171, and feedback the detection result to the controller 177. The controller 177 feedbacks driving signals to control the flow speed and flow rate of the coolant 173 according to the detection result, so as to release the heat in time to control the tool module 13 and the cooler 171 to work in a set temperature range environment.

Finally, the display terminal 179 displays a graph of the surface temperature distribution of the cooler 171 in real-time.

In the process of machining the workpiece 3 by the aforementioned laser assisted micromachining system 10, the temperature control module 17 is set up, and the working environment temperature of the tool module 13 is monitored in real-time through the temperature control module 17, and the cooling efficiency of the temperature control module 17 is improved by dynamically adjusting the flow speed and flow rate of the coolant 173 according to the monitoring results. The working environment of the cutting tool module 13 is ensured to be carried out within the preset temperature range, thereby reducing the dimensional processing defects caused by thermal expansion and cold contraction, and improving product qualification rate.

Moreover, as a further improvement of the above implementation, it is possible to increase the setting of a temperature indicator on the carrier 131 of the tool module 13, to monitor the working temperature of the carrier 131 in real time, to further accurately control the working environment temperature of the tool, and to avoid the defects caused by the heat accumulation set.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A laser assisted micromachining system, comprising:
   a work slide;
   a tool module for workpieces to be processed, the tool module comprising a carrier and a tool arranged on the carrier, the carrier supporting and fixing the tool;
   a laser module for heating the workpiece to be processed, which is disposed in the work slide and move with the work slide in three-dimensional direction, the laser module comprising a laser source, a laser transmission channel and an integrated lens for concentrating the laser beam to the surface of the workpiece, wherein the laser source generates laser beam, the laser transmission channel transfers the laser beam to the integrated lens;
   a temperature control module, comprising:
   a cooler disposed on the work slide and supporting the tool module;
   a plurality of temperature sensors disposed on the cooler;
   a controller, and
   a coolant, wherein the temperature sensors detect the real-time temperature value of the cooler, the controller receives the temperature value from the temperature sensor, and feedbacks control signals to control a working state of the coolant according to the real-time temperature value, and the coolant transmits the heat of the cooler to dissipate; wherein,
   the cooler is disposed adjacent to the tool module to receive heat transmitted from the tool module, and further comprises a plurality of through-holes, a fixed slot, and a fin disposed on a surface of the cooler, the coolant circulates in the through-hole to dissipate heat, the tool module is fixed in the fixed slot, and the fin covers the tool.

2. The laser assisted micromachining system of claim 1, wherein the temperature sensors are disposed interior and/or on a surface of the cooler respectively, and the temperature sensors detect the temperature distribution at different positions of the cooler in real-time.

3. The laser assisted micromachining system of claim 1, wherein the cooler is disposed in the work slide, and the cooler is in contact with the work slide.

4. The laser assisted micromachining system of claim 1, wherein the controller adopts closed loop automatic control technology and feedback control through PID.

5. The laser assisted micromachining system of claim 2, wherein setting a standard temperature value saved in the controller, when the temperature sensor senses the real-time temperature value of the cooler greater than the standard temperature value, the controller feedback control signal improves the working efficiency of the coolant to accelerate the heat dissipation in order to reduce the real-time temperature.

6. The laser assisted micromachining system of claim 1, wherein the coolant is a liquid coolant.

7. The laser assisted micromachining system of claim 1, wherein the temperature control module further comprises a display terminal for displaying the real-time temperature value of the cooler.

8. The laser assisted micromachining system of claim 3, wherein the carrier comprises a metal matrix shank and a groove body, the tool is fixed to the groove body of the carrier through bolts, and the metal matrix shank is housed in the fixed slot of the cooler.

9. The laser assisted micromachining system of claim 8, wherein, the integrated lens for concentrating the laser beam to the surface of the workpiece is set near the top of the tool.

10. The laser assisted micromachining system of claim 9, wherein the laser source is optical fiber laser.

11. The laser assisted micromachining system of claim 9, wherein the system further comprises a CCD for detecting laser spot size of the laser beam.

12. The laser assisted micromachining system of claim 9, wherein the laser transmission channel runs through the cooler and extends to the fixed slot, one end of the laser transmission channel is connected with the integrated lens and is fixed to the tool.

13. The laser assisted micromachining system of claim 1, wherein the work slide further comprises a horizontal knob for driving the tool module and the integrated lens to move along the horizontal direction and a vertical knob for driving the tool module and the integrated lens to move along the vertical direction.

* * * * *